US005570145A

United States Patent [19]

Soneda

[11] Patent Number: 5,570,145

[45] Date of Patent: Oct. 29, 1996

[54] METHOD OF FORMING PHOSPHOR SCREEN OF COLOR CATHODE-RAY TUBE AND EXPOSURE APPARATUS

[75] Inventor: Kouichi Soneda, Kumagaya, Japan

[73] Assignee: Kabushiki Kaisha Toshiba, Kawasaki, Japan

[21] Appl. No.: 313,796

[22] Filed: Sep. 28, 1994

[30] Foreign Application Priority Data

Sep. 30, 1993 [JP] Japan .................................... 5-244093

[51] Int. Cl.$^6$ .................................................... G03B 41/00

[52] U.S. Cl. ............................................................ 396/547

[58] Field of Search .................................... 354/1; 430/24

[56] References Cited

U.S. PATENT DOCUMENTS

| | | | |
|---|---|---|---|
| 4,052,123 | 10/1977 | Yamazaki et al. | 350/189 |
| 5,132,187 | 7/1992 | Morohashi | 430/24 |

FOREIGN PATENT DOCUMENTS

| | | | |
|---|---|---|---|
| 0294867 | 12/1988 | European Pat. Off. . | |
| 0400629 | 12/1990 | European Pat. Off. . | |
| 0415286 | 3/1991 | European Pat. Off. . | |
| 5212563 | 1/1977 | Japan | 354/1 |
| 60-54135 | 3/1985 | Japan . | |
| 60-163336 | 8/1985 | Japan . | |
| 60-178451 | 9/1985 | Japan . | |
| 62-17925 | 1/1987 | Japan . | |
| 3089430 | 4/1991 | Japan | 354/1 |

*Primary Examiner*—Michael L. Gellner
*Assistant Examiner*—Christopher E. Mahoney
*Attorney, Agent, or Firm*—Cushman Darby & Cushman, L.L.P.

[57] ABSTRACT

An exposure apparatus for exposing a resist film coated on the inner surface of a face panel in a color cathode-ray tube through a shadow mask with a number of apertures apparatus comprises an exposure light source having an optical axis coaxial with an axis of the face panel, for radiating a light beam onto the inner surface of the face panel through the shadow mask. A discontinuous lens is arranged between the exposure light source and the shadow mask to be rotatable about the optical axis. The discontinuous lens has first and second regions arranged adjacent to one another in the direction of rotation of the discontinuous lens. A light beam from the exposure light source is guided by means of the first and second regions to the shadow mask along different paths. The lens is rotated by a drive motor so that the light beam from the light source passes through each of the apertures along two different paths.

10 Claims, 3 Drawing Sheets

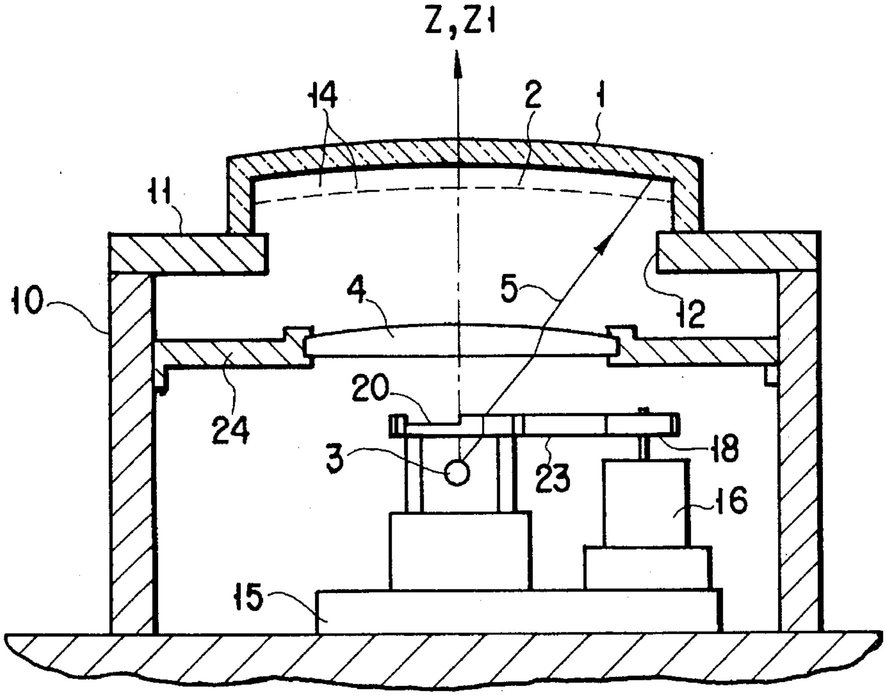
FIG. 1
FIG. 2
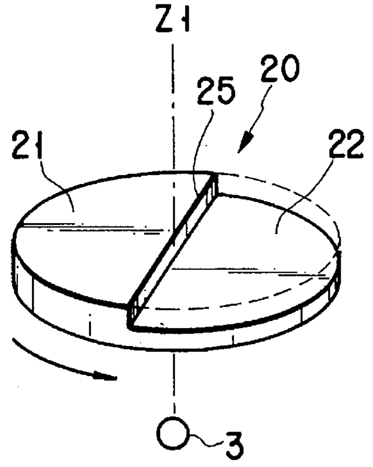
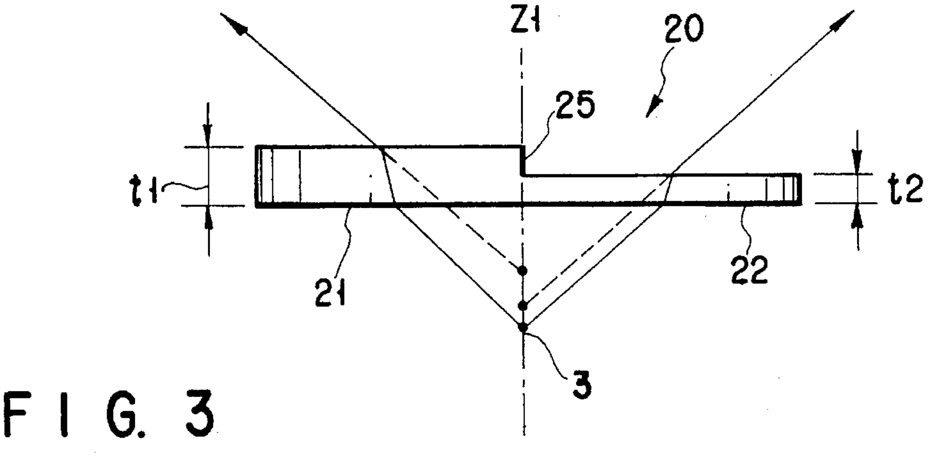
FIG. 3

METHOD OF FORMING PHOSPHOR SCREEN OF COLOR CATHODE-RAY TUBE AND EXPOSURE APPARATUS

BACKGROUND OF THE INVENTION

1. Field of the Invention

The present invention relates to a method for forming a phosphor screen for a color cathode-ray tube and an exposure apparatus, and more particularly to a method for forming a black matrix between phosphor dots and an exposure apparatus.

2. Description of the Related Art

The phosphor screen of a color cathode-ray tube is constituted by phosphor dots having three luminescent colors and coated on the inner surface of a face panel, and a black material (black matrix) embedded between the phosphor dots and irrelevant to light emission.

In general, a method of manufacturing the phosphor screen mainly includes a black matrix forming step and a phosphor dot forming step, and employs a printing method using a photoresist.

Specifically, in the black matrix forming step, a polyvinyl alcohol (PVA) containing a photosensitive material, which is hardened when an ultraviolet ray is applied thereto, is coated on the inner surface of a panel to form a photoresist film. Then, an exposure light source is set in a position corresponding to the position from which an electron beam of each color is to be emitted, and a light beam is emitted from the source onto the photoresist film through a shadow mask opposed to the inner surface of the panel. As a result, predetermined portions of the photoresist film corresponding to the electron beam apertures in the shadow mask, i.e., those portions on which phosphor dots are formed, are exposed to the light beam. After the exposure step, non-exposed portions are removed from the photoresist film, thereby forming a resist pattern. Subsequently, a black material is coated on the resist pattern, and an oxidizer is injected onto the inner surface of the panel to decompose the resist. The resist and an unnecessary portion of the black material are removed by spraying water with high pressure, thereby forming a black matrix with holes for forming phosphor dots therein.

In the phosphor dot forming step, a slurry consisting of a photosensitive PVA liquid and phosphor particles dispersed therein is coated on the black matrix on the panel inner surface, and only those portions of the slurry which correspond to the holes of the black matrix are exposed to light with the use of a shadow mask, as in the above-described exposure step, thereby attaching phosphor thereto, and removing the other portions by spraying water with high pressure. This step is repeated for forming phosphor dots of each color.

An exposure apparatus to be used in the above-described exposure step generally has a frame for supporting the panel on which the black matrix and the phosphor dots are to be formed, and the shadow mask located on the inner side of the panel; an exposure light source for emitting light onto the inner surface of the panel with the shadow mask interposed therebetween and a correction lens provided between the exposure light source and the shadow mask, for causing the path of light from the exposure light source to approach the path of an electron beam.

The light from the exposure light source is restricted through circular electron beam apertures in the shadow mask, forming substantially circular exposed portions in the resist film on the inner surface of the panel, and forming a black matrix in the same manner as described above. Each hole of the black matrix has the same shape as the cross section of the bundle of the exposure light rays radiated onto the panel.

In the case of a color cathode-ray tube for a very high-resolution display, which has a shadow mask with apertures arranged with a small pitch, it is preferable to form the shadow mask thick, in order to keep a sufficient mechanical strength of the shadow mask, in light of manufacturing the tube. Each aperture of the shadow mask is generally defined by a boundary portion between a smaller opening formed in the surface of the shadow mask facing the electron gun and a larger opening formed in the surface of the mask facing the phosphor screen. The smaller opening is made to have a predetermined transmittance. In order to keep the strength of the shadow mask at a desired value, however, there is a case where the larger opening cannot have a sufficient size. For this reason, the exposure light beam to be applied to that part of the black matrix which is located in a peripheral portion of the phosphor screen is influenced not only by the aperture defined by the boundary portion between the larger and smaller openings, but also by the smaller and larger openings themselves.

As a result, in the peripheral portion of the phosphor screen, part of a hole formed in the black matrix is deformed to have the shape of an elliptic. Since the shape of the holes in the black matrix corresponds to that of phosphor dots, a non-circular phosphor dot is created, thereby reducing the light output of the color cathode-ray tube.

To solve the above problem, there has been proposed a method for improving an aperture in the shadow mask to have the shape of an ellipse whose major axis extends in a radial direction; or a method for moving a light source in the direction of the tube axis at the time of exposing the photoresist film (Jpn. Pat. Appln. KOKAI Publication No. 62-17925).

However, in the method for improving the apertures of the shadow mask to have the shape of an ellipse whose major axis extends in a radial direction, an area of the remaining portion of the shadow mask is reduced and hence the strength of the mask is reduced. Further, in the method for moving a light source in the direction of the tube axis at the time of exposing the photoresist film, the exposure unit inevitably has a complicated structure. Especially, in the case of using a rotary light source in this method, the exposure unit is much more complicated, and therefore the accuracy of assembly of the unit is reduced, degrading the quality of the color cathode-ray tube.

SUMMARY OF THE INVENTION

The present invention has been contrived in consideration of the above problems, and its object is to provide a method capable of easily manufacturing a phosphor screen for a color cathode-ray tube, which has at the peripheral portion thereof a sufficient light output and a brightness substantially identical to that of a central portion of the screen without degrading the quality of the cathode-ray tube, and to provide an exposure apparatus used in the manufacturing method.

In order to achieve the above object, according to an aspect of the invention, there is provided a method of producing a phosphor screen for a color cathode-ray tube, comprising the steps of: forming a resist film on an inner surface of a face panel; and radiating a light beam onto the resist film through a shadow mask having a number of apertures to expose, by means of the light beam passed through the apertures, those portions of the resist film in which phosphor dots are to be formed. The exposure step includes the processes of: radiating a light beam from an exposure light source toward the shadow mask; and rotating, about the optical axis of the light, a discontinuous lens medium provided between the light source and the shadow mask and having a plurality of regions which guide the light beam from the light source to the shadow mask along different paths, respectively, thereby allowing the light beam to pass each of the apertures along at least two different paths.

According to another aspect of the invention, there is provided an exposure unit for exposing, through a shadow mask with a number of apertures, those portions of a resist film coated on the inner surface of a face panel in a color cathode-ray tube, in which phosphor dots are to be formed, comprising: an exposure light source having an optical axis coaxial with an axis of the face panel, for radiating a light beam onto the inner surface of the face panel through the shadow mask; a discontinuous lens medium arranged between the exposure light source and the shadow mask and rotatable about the optical axis, the discontinuous lens medium having a plurality of regions arranged adjacent to one another in the direction of rotation of the discontinuous lens medium, for guiding the light beam from the exposure light source to the shadow mask along different paths; and drive means for rotating the discontinuous lens medium so as to pass the light beam through each of the apertures along at least two different paths.

with the present invention, by exposing the resist film while rotating the discontinuous lens medium with a plurality of regions, the light from the source passes through each of the apertures of the shadow mask along at least two different paths. Thus, the light beam passed through each aperture is incident on the resist film at two or more different angles. As a result, at least two areas of the resist film are exposed by the light beam passed through each aperture of the shadow mask. These two exposed areas each having an elliptical shape overlap one another and constitute as a whole a substantially circular exposed area. Accordingly, substantially circular holes for phosphor dots can be formed in the black matrix.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 3 show an exposure apparatus according to an embodiment of the present invention, wherein:

FIG. 1 is a cross sectional view of the exposure apparatus,

FIG. 2 is a perspective view of a discontinuous lens of the exposure apparatus, and FIG. 3 is a schematic view showing the paths of light beams through the discontinuous lens;

FIGS. 4A to 6 show an exposure method of the present invention using the exposure apparatus, wherein:

FIG. 4A is a schematic view showing the path of a light beam having passed a first region of the discontinuous lens, FIG. 6 is a view showing changes of the exposed regions of the resist film;

DETAILED DESCRIPTION OF THE PREFERRED EMBODIMENTS

Figure 4A:
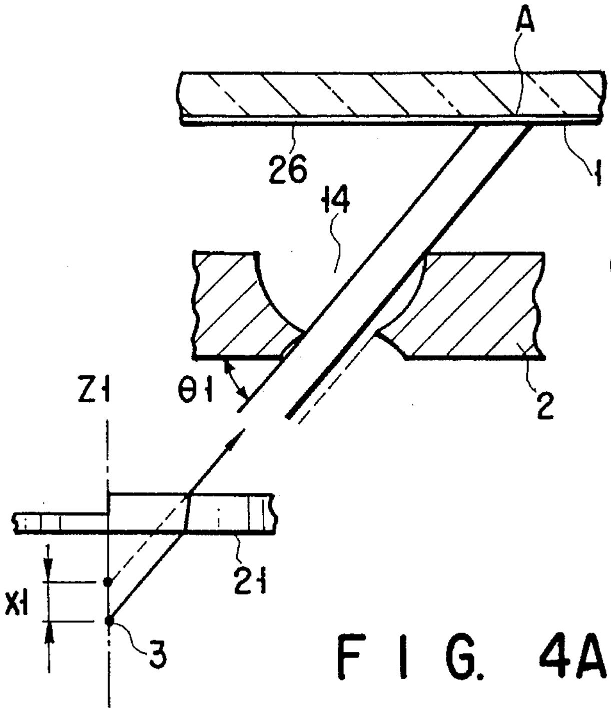

An embodiment of the invention will be explained with reference to the accompanying drawings.

As shown in FIG. 1, an exposure apparatus according to an embodiment of the invention has a support frame 10, and a panel mounting plate 11 attached to the upper end of the support frame 10 and having an opening 12. A face panel 1 for a color cathode tube is mounted on the panel mounting plate 11 such that the inner surface of the panel 1 faces the interior of the frame 10 and covers the opening 12. A shadow mask 2 having a number of circular apertures 14 iS attached to the face panel 1, facing the inner surface of the face panel 1.

An exposure light source 3, a discontinuous lens 20, and a correction lens 4 are arranged inside the support frame 10 in this order toward the panel 1. The optical axes of these optical elements coaxial with the center axis Z of the panel 1, i.e., the tube axis. The exposure light source 3 includes, for example, of a mercury lamp, and is placed on a support table 15. The discontinuous lens 20 is supported on the table 15 such that it can rotate about the center axis Z. A motor 16 serving as drive means is mounted on the table 15, and a driving belt 23 is bridged between a drive pulley 18 attached to the drive shaft of the motor 116 and a lens frame fitted around the discontinuous lens 20. The discontinuous lens 20 can be rotated by the drive motor 16 at a speed of about 30–60 rpm.

The correction lens 4 is attached to the support frame 10 via a lens frame 24. The correction lens 4 is provided for causing a light beam from the exposure light source 3 to substantially coincide with the optical path of an electron beam emitted from an assembled cathode tube. The lens 4 has a known structure and hence is not explained in detail here.

As shown in FIGS. 2 and 3, the discontinuous lens 20 serving as a discontinuous lens medium in the present invention has two or more regions, which are arranged in the direction of rotation about the center axis Z, for guiding a light beam from the light source 3 to the shadow mask 2 along different paths. More specifically, the discontinuous lens 20 is formed in a disk-shape as a whole, and has a first semicircular region 21 having a thickness t1 and a second semicircular region 22 having a thickness t2 thinner than the thickness t1. The first and second regions contact each other in a plane 25 including the optical axis Z1 of the light source 3.

In the discontinuous lens 20 in this embodiment, the first and second regions 21 and 22 are formed integral as one body and made of the same material. The difference in thickness between the regions 21 and 22 causes the light beams, emitted from the source 3 and passed the regions 21 and 22, respectively, to take different paths. Thus, the discontinuous lens 20 has two different optical paths. The discontinuous lens 20 is rotated by the drive motor 16 about the optical axis Z1 of the light source 3 coaxial with the tube axis Z.

An exposure method using the above-described exposure apparatus will now be explained.

First, a photoresist film is formed on the inner surface of the face panel 1 in a known manner. Subsequently, the shadow mask 2 is attached, opposed to the inner surface of the panel 1, and then the panel 1 is placed in a predetermined position of the panel mounting plate 11 of the exposure apparatus.

Then, the photoresist film is exposed by the exposure apparatus. In the exposure apparatus constructed as above, light from the light source 3 passes the rotating discontinuous lens 20, the correction lens 4 and the shadow mask 2, and reaches the inner surface of the panel 1. At this time, the light having passed the discontinuous lens 20 passes the correction lens 4, irrespective of whether the light has passed the first region or the second region. Therefore, no explanation will be given of the correction lens 4 for making the overall explanation brief.

Figure 4B:
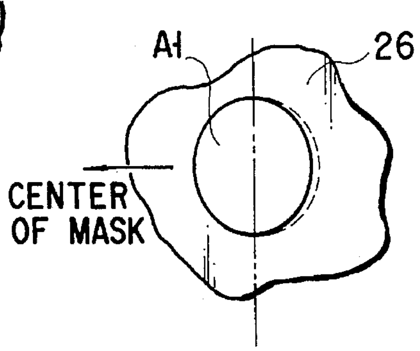
FIG. 4B is a view showing the region of a resist film which is exposed by the light beam having passed the first region of the discontinuous lens.

The operation of the discontinuous lens 20 under the above conditions will be explained. Referring first to the case shown in FIG. 4A where a light beam from the light source 3 reaches a target region A on the resist film (i.e., at which point a phosphor dot is formed) on the inner surface of the panel 1 after passing the first region 21 of the discontinuous lens 20 having the thickness t1, an apparent position of the light source approaches the panel 1 by a distance x1 corresponding to the thickness t1 due to refraction of light when it passes the first region 21. Here, suppose that the light beam enters the shadow mask 2 at an incident angle $\theta1$. Then, a first radiation region A1 of the resist film 26 radiated by the light beam having passed the aperture 14 in the shadow mask 2 has an elliptical shape as shown in FIG. 4B.

Figure 5A:
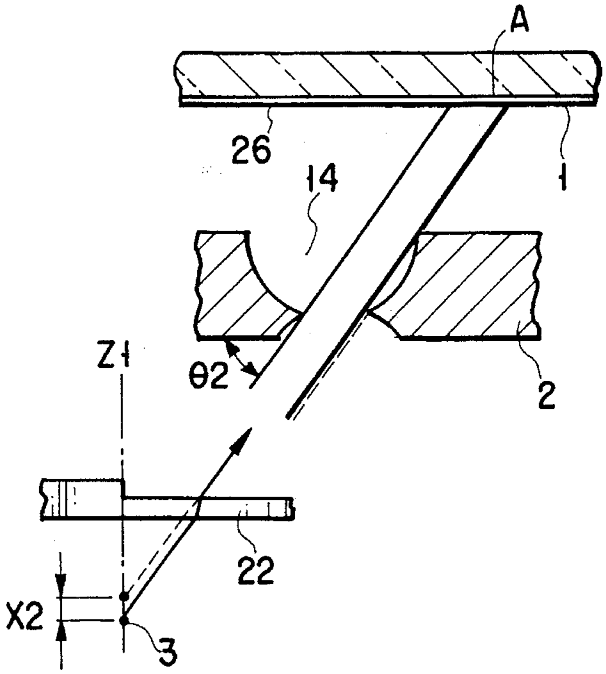
FIG. 5A is a schematic view showing the path of a light beam having passed a second region of the discontinuous lens.
Figure 5B:
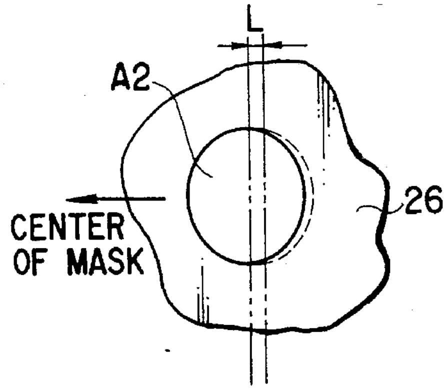
FIG. 5B is a view showing the region of the resist film which is exposed by the light beam having passed the second region of the discontinuous lens.

When the discontinuous lens 20 has been rotated through a certain angle, the light beam directed to the target region A on the resist film 26 passes the second region 22 of the lens 20 having the thickness t2, as shown in FIG. 5A. The light beam having passed the second region 22 reaches the resist film 26 through the correction lens 4 and the aperture 14 of the shadow mask 2. A second radiation region A2 of the resist film 26 radiated by the light beam having passed the aperture 14 has an elliptical shape shown in FIG. 5B.

Figure 6:
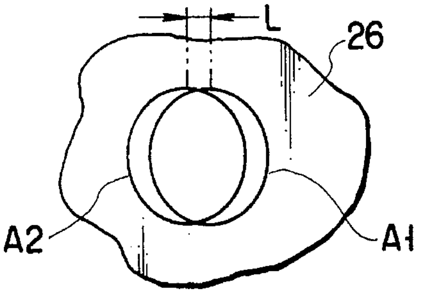

At this time, an apparent position of the light source approaches the panel 1 by a distance x2 corresponding to the thickness t2 due to refraction of the light beam when it passes the second region 22. Here, suppose that the light beam enters the shadow mask 2 at an incident angle $\theta2$. Since the relationship between the thickness t1 and t2 is $t1>t2$, the relationship between the distances x1 and x2 is $x1>x2$ if the first and second regions 21 and 22 are formed of the same material. Further, since the distance between the actual position of the light source and the center of the shadow mask 2 and that between the center of the shadow mask 2 and the target region A are constant, the incident angle $\theta2$ is greater than $\theta1$ ($\theta2>\theta1$). Thus, the light beams directed to the target region A through the first and second regions 21 and 22 of the discontinuous lens 20 have different paths. As a result, the second radiation region A2 is displaced from the first radiation region A1 by a distance L toward the center of the face panel 1, as shown in FIG. 6.

The incident angle of the light beam is repeatedly changed by two steps by rotating the discontinuous lens 20 at a predetermined speed. The amount of a displacement L between the radiation regions A1 and A2 is adjusted by adjusting the thicknesses of the regions 21 and 22 of the lens 20. Thus, by suitably adjusting the thicknesses of the regions 21 and 22, the shape of each exposed region A (A1+A2) of the resist film 26 can be reached to a substantially circle. As a result, the holes of the black matrix for forming phosphor dots therein can be formed to have a desired shape and size.

The exposure method has been explained with reference to the case of forming holes corresponding to that one of electron beams emitted from an electron gun which is positioned in the tube axis Z. In general, to form a plurality of phosphor dots, exposure is performed by displacing the light source in accordance with the positions of electron beams of the respective three colors. Also in this embodiment, to form holes corresponding to electron beams emitted from positions displaced from the tube axis Z, the position of the light source 3 is displaced from the tube axis Z to expose the resist film 26. At the same time, the discontinuous lens 20 is moved in accordance with the position of the light source, and is rotated about the optical axis Z1 of the light source.

Since in the discontinuous lens 20 in the embodiment, the first and second regions 21 and 22 contact each other in the plane 25 including the optical axis Z1 of the light source 3, the influence of the plane 25 upon the regions 21 and 22 can be ignored as a whole because of the rotation of the plane 25 about the optical axis of the light source.

Figure 7:
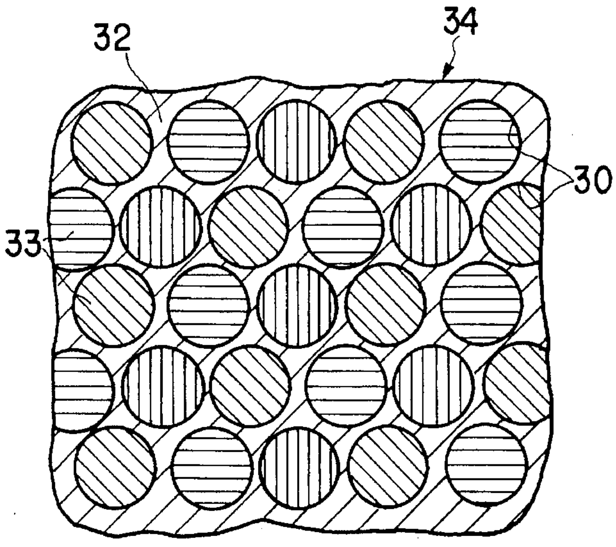
FIG. 7 is a plane view of a phosphor screen.

After the above-described exposure step, a nonexposed portion of the photoresist film 26 is removed, thereby forming a resist pattern. Subsequently, as shown in FIG. 7, a black matrix 32 having holes 30 is formed and phosphor dots 33 of respective colors are formed in the holes 30 by the use of a known method, thus forming a desired phosphor screen 34 on the inner surface of the face panel 1.

According to the above embodiment, the holes 30 of the black matrix 32 can be formed substantially circular throughout the overall the phosphor screen 34. This is greatly advantageous as compared with the conventional case, wherein holes formed in a peripheral portion of the phosphor screen have an elliptical shape whose major axis extends in a direction perpendicular to the radial direction, and in particular, where holes formed in the corner portions of the phosphor screen have an elliptical shape with the ratio of the minor axis to the major axis being about 88%–95%.

Although the discontinuous lens 20 or discontinuous lens medium employed in the above embodiment has first and second regions made of substantially the same material and having different thicknesses, the medium is not limited to this, but can have various constructions.

Figure 8:
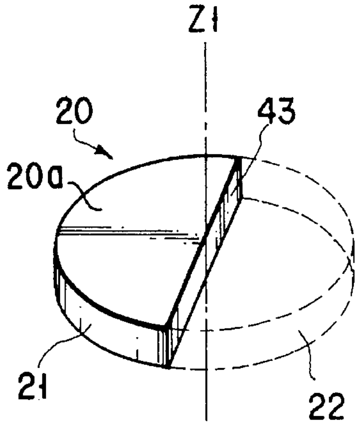
FIG. 8 is a perspective view showing a first modification of the discontinuous lens.

A discontinuous lens medium 20 shown in FIG. 8 includes a semicircular glass plate 20*a*, which is formed by cutting a circular glass plate at the center thereof and has a cutting surface or an obscured glass surface 43 including the optical axis Z1 of the light source serving as the center of rotation. By virtue of this structure, the lens medium 20 has a first region 21 consisting of the glass plate 20*a* and a second region 22 with no glass plate adjacent to the first region 21 in the vicinity of the surface 43 including the optical axis Z1. Thus, the light beam from the light source propagates along one of two different optical paths depending upon whether or not the light beam passes the glass plate 20*a*. As a result, the same advantage as in the above embodiment can be obtained.

Figure 9:
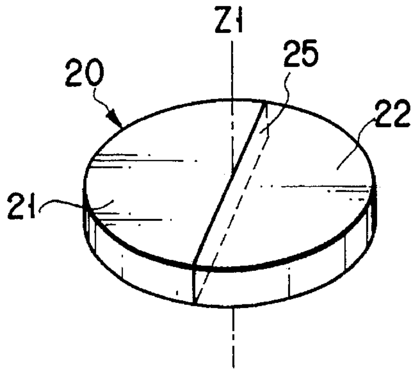
FIG. 9 is a perspective view showing a second modification of the discontinuous lens.

A discontinuous lens 20 or discontinuous lens medium shown in FIG. 9 is formed in a disk-shape lens as a whole, and has a semicircular first region 21 of a refraction index n1 and a semicircular second region of a refraction index n2, with a plane 25 interposed therebetween and including the optical axis Z1 of the light source 3. Since the first and second regions 21 and 22 have different refraction indices, the light beam from the light source 3 takes different paths when it passes the first and second regions, respectively. In this case, too, the same advantage as described above can be obtained.

Figure 10:
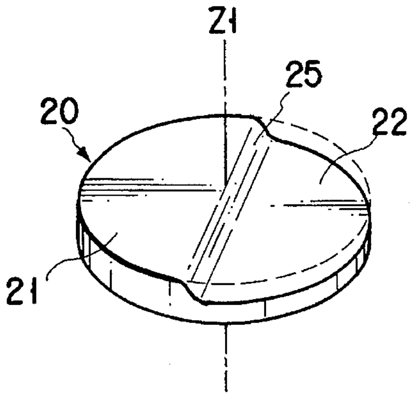
FIG. 10 is a perspective view showing a third modification of the discontinuous lens.

A discontinuous lens 20 or discontinuous lens medium shown in FIG. 10 is similar to the lens shown in FIG. 2 except that the step 25 smoothly inclines.

Figure 11:
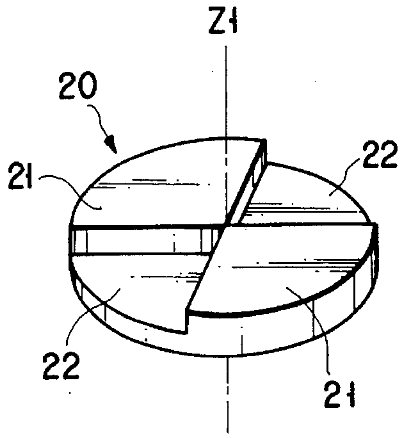
FIG. 11 is a perspective view showing a fourth modification of the discontinuous lens.

Moreover, a discontinuous lens 20 or discontinuous lens medium shown in FIG. 11 is formed in a disk-shape and has two first regions 21 with a thickness t1 and two second regions 22 with a thickness t2. The first and second regions 21 and 22 are alternately arranged in the direction of rotation. Also in this structure, the light beam from the light source 3 takes different paths depending upon whether it passes the first region or the second region, and the same advantage as in the above embodiment can be obtained.

Figure 12:
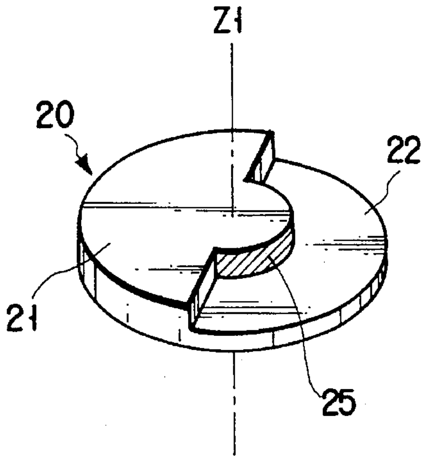
FIG. 12 is a perspective view showing a fifth modification of the discontinuous lens.

Although in the above-described discontinuous lens media, the regions which cause the difference in optical path contact each other in the vicinity of the optical axis, a discontinuous lens medium shown in FIG. 12 may be used in order to obtain the advantage of the invention only in a peripheral portion of the phosphor screen. Specifically, the discontinuous lens medium 20 is formed of a substantially circular lens, and a boundary portion 25 between first and second regions 21 and 22 is displaced from the optical axis Z1 of the light source such that the whole central portion of the lens is constituted by the first or second region (the first region 21 in the case of FIG. 12). In this modification, however, it is possible that the illumination balance differs between the central portion and the peripheral portion of the face panel due to the influence of the hatched region of the boundary portion 25. To avoid this, an illumination correcting filter or the like may be employed.

Although in the above-described embodiment and modifications, the light beam having passed an aperture in the shadow mask can take two different paths by virtue of the discontinuous lens medium with two regions, the number of regions in the discontinuous lens medium may be increased to enable the light beam to take three or more paths, if necessary.

Furthermore, in the above-described exposure method, the hole in the black matrix which is shaped like an ellipse as a result of a peripheral portion of a circle being cut off is corrected to have the shape of substantially a circle. However, the hole can be corrected, by appropriately setting the regions of the discontinuous lens medium, to have the shape of an ellipse whose major axis extends in a radial direction with respect to the tube axis as the center.

As explained above, the invention can perform exposure while changing the angle of a light beam passing an aperture in a shadow mask, thereby forming a hole of a desired size and shape in the peripheral portion of a black matrix.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of producing a phosphor screen for a color cathode-ray tube, the method comprising the steps of:

forming a resist film on an inner surface of a face panel; and radiating a light beam onto the resist film through a shadow mask having a number of apertures to expose, by means of the light passed through the apertures, those portions of the resist film in which phosphor dots are to be formed;

the exposure step including radiating a light beam from an exposure light source toward the shadow mask; and continuously rotating at a predetermined speed, about the optical axis of the light source, a discontinuous lens medium provided between the light source and the shadow mask and having a plurality of regions which guide the light beam from the light source to the shadow mask along different paths, respectively, thereby allowing the light beam to repeatedly pass the reqions of the discontinuous lens medium in order so as to pass each of the apertures along at least two different paths.

2. An exposure apparatus for exposing, through a shadow mask with a number of apertures, those portions of a resist film coated on the inner surface of a face panel in a color cathode-ray tube, in which phosphor dots are to be formed, said apparatus comprising:

an exposure light source having an optical axis coaxial with an axis of the face panel, for radiating a light beam onto the inner surface of the face panel through the shadow mask;

a discontinuous lens medium arranged between the exposure light source and the shadow mask and rotatable about the optical axis, the discontinuous lens medium having a plurality of regions arranged adjacent to one another in the direction of rotation of the discontinuous lens medium, for guiding the light beam from the exposure light source to the shadow mask along different paths; and drive means for continuously rotating the discontinuous lens medium at a predetermined speed so that the light beam repeatedly passes the reqions of the discontinuous lens medium in order and passes through each of the apertures along at least two different paths.

3. An exposure apparatus according to claim 2, wherein the regions of the discontinuous lens medium have different thicknesses in the direction of the optical axis.

4. An exposure apparatus according to claim 3, wherein the discontinuous lens medium is formed in a disk-shape lens and has a first semicircular region with a first thickness and a second semicircular region with a second thickness.

5. An exposure apparatus according to claim 4, wherein the discontinuous lens medium has a first semi-circular region with a first refractive index and a second semicircular region with a second refractive index, and the first and second semicircular regions contact each other in a plane including the optical axis and form a disk shape.

6. An exposure apparatus according to claim 2, wherein the regions of the discontinuous lens medium have refractive indices differing from one another.

7. An exposure apparatus according to claim 6, wherein the discontinuous lens medium includes a semi-circular lens which constitutes a first region and has a predetermined refractive index and a plane including the optical axis.

8. An exposure apparatus according to claim 2, wherein the discontinuous lens medium has a flat boundary portion including the optical axis and dividing the regions.

9. An exposure apparatus according to claim 2, wherein the discontinuous lens medium has a disk-shape coaxial with the optical axis, and first and second regions adjacent to each other, the first region having a portion located in the central portion of the lens medium which includes the optical axis.

10. An exposure apparatus for exposing, through a shadow mask with a number of apertures, those portions of a resist film coated on the inner surface of a face panel in a color cathode-ray tube, in which phosphor dots are to be formed, said apparatus comprising:

an exposure light source having an optical axis coaxial with an axis of the face panel, for radiating a light beam onto the inner surface of the face panel through the shadow mask;

a discontinuous lens medium arranged between the exposure light and the shadow mask and rotatable about the optical axis, the discontinuous lens medium having a plurality of regions arranged adjacent to one another in the direction of rotation of the discontinuous lens medium, for guiding the light beam from the exposure light source to the shadow mask along different paths, and the discontinuous lens medium having a flat boundary portion including the optical axis and dividing the regions; and drive means for rotating the discontinuous lens medium so as to pass the light beam through each of the apertures along at least two different paths.

* * * * *